United States Patent [19]
Nagao

[11] 4,184,454
[45] Jan. 22, 1980

[54] ANIMAL FUMIGATING UNIT

[76] Inventor: La Dee Nagao, 1602 Kalaniuka Cir., Honolulu, Hi. 96821

[21] Appl. No.: 856,948

[22] Filed: Dec. 2, 1977

[51] Int. Cl.2 .............................................. A01K 29/00
[52] U.S. Cl. ..................................................... 119/160
[58] Field of Search .................... 119/160, 99; 160/179

[56] References Cited

U.S. PATENT DOCUMENTS

| | | | |
|---|---|---|---|
| 2,445,055 | 7/1948 | Capaul | 119/19 X |
| 2,832,406 | 4/1958 | Turenne | 160/179 |
| 3,941,092 | 3/1976 | Winters | 119/160 |

FOREIGN PATENT DOCUMENTS

| | | | |
|---|---|---|---|
| 293751 | 7/1967 | Australia | 160/179 |

*Primary Examiner*—Louis G. Mancene
*Assistant Examiner*—Daniel J. Leach
*Attorney, Agent, or Firm*—James C. Wray

[57] ABSTRACT

An animal fumigating unit is provided for defleaing animals. The unit comprises a container having a rotatively displaceable rear wall and having an opening in the front wall to enable the head of a contained animal to project exteriorly of the container. A flexible material is attached to the container and covers the opening. Radially symmetrical slits in the material intersect in alignment with the center of the opening enabling the material to fit firmly around the animal's neck.

12 Claims, 3 Drawing Figures

16 44 46 40 22 24 14 26 20 10 12 18

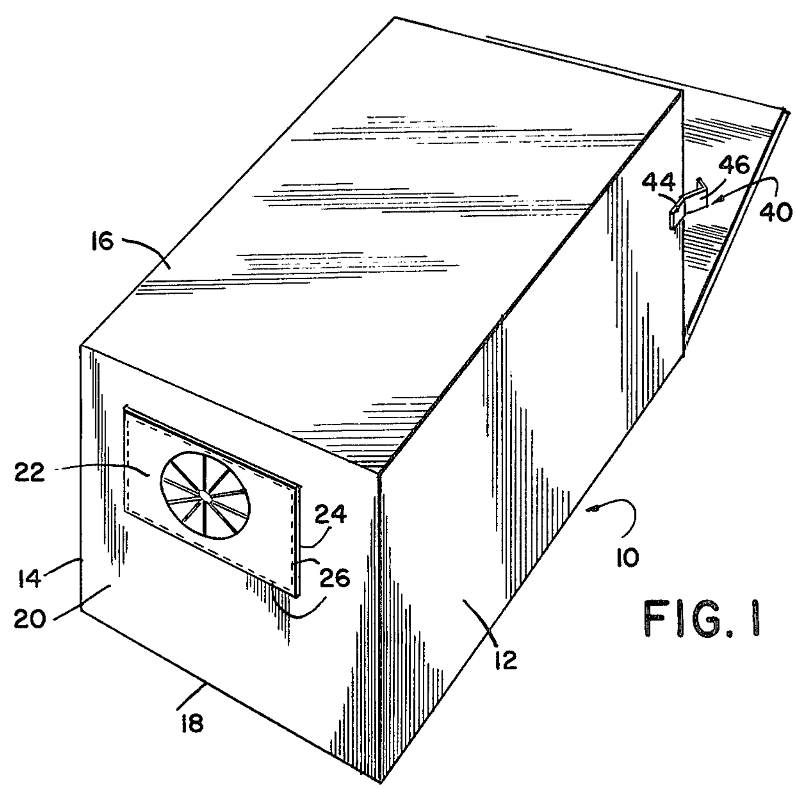
FIG. 1
FIG. 3
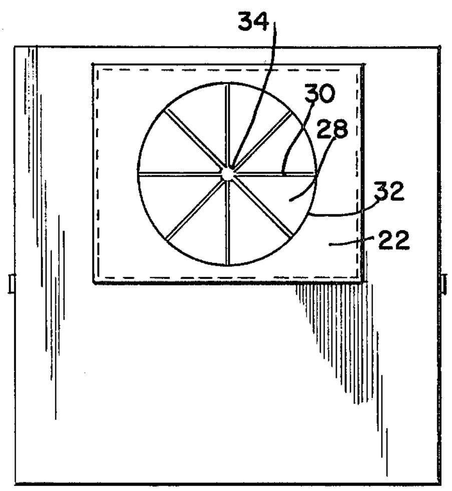
FIG. 2
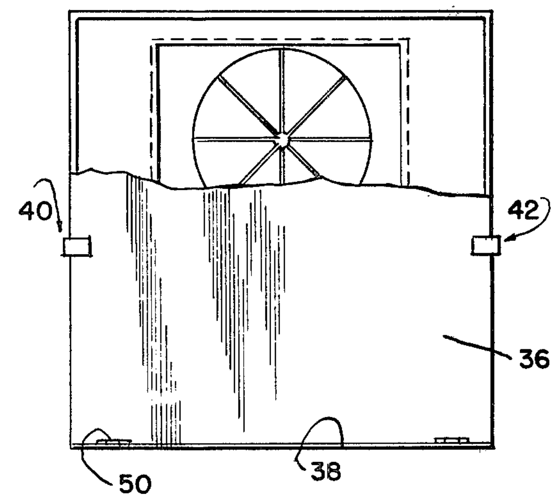

ANIMAL FUMIGATING UNIT

BACKGROUND OF THE INVENTION

This invention relates generally to animal fumigating devices and more particularly has reference to a container used to facilitate the permanent killing of fleas on animals through concentrated fumigation.

DESCRIPTION OF THE PRIOR ART

Pertinent United States and foreign patents are found in Class 119, Subclasses 1, 96, 15, 156, 158 159 and 160 of the official classifications of patents in the United States Patent and Trademark Office.

Examples of pertinent patents are U.S. Pat. Nos. 301,637; 624,420; 2,536,943; 3,428,030; 3,749,064; 3,941,092 and British Patent No. 10,132.

U.S. Pat. Nos. 301,637, and 624,420 cover vapor baths, primarily for horses, in which the animal is completely enclosed with the exception of its head. The front of the bath has a cloth like material having an aperture positioned to receive the head of an animal projecting therethrough.

Patent 2,536,943 covers an animal bath having an adjustable opening in the top for securing the animal. A draw string is used to adjust the size of the opening.

In Patent 3,749,064 a housing of transparent, flexible material is used in a process for spraying and defleaing animals. There is an opening in the top through which the head of the animal can project.

Patent 3,941,092 is a portable animal care unit having a rigid wall structure and using rigid adapter plates to adjust the size of openings in the walls.

British Patent No. 10,032 shows an animal fumigation container having an aperture at one end for the head of the animal. The aperture is covered by a flexible, air tight material adjustable by means of a draw string or elastic band.

Many problems remain in the prior art devices designed to facilitate animal fumigation.

One problem existing with the other devices is that the access means are not designed to facilitate proper placement of a reluctant animal inside the container. Another problem lies in the inability of the material surrounding the animal's neck to automatically conform snugly around the neck and to remain snug despite excessive movement by the animal. Furthermore, the means used to secure the material around the animal's neck have a tendency to cause discomfort to the animal. One further problem is that the injection of fumigating substances into the container is somewhat hampered by a lack of convenient access to the interior of the container once the animal is placed in the container.

The present invention overcomes many of the problems which exist in the prior art devices. The present invention provides, in preferred form, a box like container having a flap in the back for the animal to walk in and a circular opening in the front for the animal's head. The back flap has fasteners to secure it closed. The circular opening has a stretchy fabric or plastic material confirgured to fit firmly around the animal's neck. Radially symmetrical slits in the material provide the firm fit.

It is one object of this invention to provide an animal fumigating device having means to facilitate the proper positioning of a reluctant animal within the device.

Another object of this invention is to provide an animal container having an opening covered with a material designed to automatically conform snugly around the animal's neck and to automatically remain snug despite excessive movement by the animal.

Still another object is to provide a container which causes no discomfort to an animal during the fumigation process.

A further object is to provide a container having means to conveniently inject the fumigating substances into the interior of the container while insuring effective fumigation of the entire animal.

Yet another object of the invention is to provide an animal fumigating apparatus having a container provided with an opening sufficiently large to receive the had of an animal, means carried by the container for providing access to the interior of the container, the flexible member connected to the container and extending across said opening, the flexible member having a portion aligned with the opening provided with intersecting radial slits, said slits having sufficient lengths to enable said portion to flexibly receive the head of an animal projecting therethrough.

Another object of the invention is to provide an animal fumigating apparatus having a container provided with a first opening sufficiently large to recieve the head of an animal, a flexible member connected to the container and extending across said opening, a portion of the member aligned with the first opening provided with a second opening, means carried by the flexible member for enabling said portion to flexibly receive the head of an animal projecting therethrough, the container further provided with side walls, means connected to the container and a first side wall enabling selective displacement of the first side wall, said first opening provided in a second side wall, the first and second side walls disposed in opposition.

Still another object is to provide a flexible member extending across an opening in a container having intersecting slits which are radially symmetrical and which intersect in substantial alignment with the center of the opening.

These and other and further objects and features of the invention are apparent in the disclosure which includes the above and below specifications and claims and drawings.

BRIEF DESCRIPTION OF THE DRAWINGS

FIG. 1 is a perspective view of an animal fumigation unit constructed according to the present invention.

FIG. 2 is a rear elevation, partly in section, of the unit shown in FIG. 1.

FIG. 3 is a front elevation of the unit shown in FIG. 1.

DETAILED DESCRIPTION OF THE DRAWINGS

An animal fumigation container 10 embodying the features of the present invention is shown in FIG. 1. The container 10 is sufficiently large to completely enclose the body of an animal, with the exception of the animal's head. It is understood that the container 10 can be constructed in various sizes to accommodate many different sized animals. Preferably, the container 10 will be constructed of a heavy cardboard material and will be easily collapsible for storage and shipping.

The container 10 has a displaceable rear wall 36. The lower edge of the wall 38 is connected to the bottom of the container 10 by a pair of hinges 50. The hinges 50 enable the wall 36 to act as a flap opening at the top 16 of the container 10. When the flap 36 is fully opened, a large entryway to the container is exposed permitting the animal to easily walk into the interior of the container 10.

The front wall 20 of the container 10 has a circular opening 32 sufficiently large to receive the head of an animal. The opening 32 is covered with a stretchy or plastic material connected to the front wall 20 of the container 10 by any appropriate means. In a preferred embodiment, stitching 26 is used to attach the perimeter of the material 22 to the front wall 20 of the contain 10.

The portion 28 of the material 22 aligned with the opening 32 provided with radially symmetrical slits 30. A small circular opening 34 in the material 22 is aligned with the center of the opening 32 at the point of intersection of the slits 30. This configuration allows an animal placed inside the container 10 to project its head and neck exteriorly of the container 10. The resilient material 22 covering the opening 32 fits snugly around the animal's neck to prevent fumigating substances from seeping outside the container 10. The flexible qualities of the material 22 combined with the radial slit configuration enable the material 22 to confortably and securely grip the animal's neck even should the animal move significantly or abruptly.

In operation, the rear flap 36 is fully open and the animal lead inside the container 10. The animal's head and neck are then put through the opening 32 at the front 20 of the container 10. The material 22 protects the animal's face from potentially harmful fumigating substances inside the container 10. Suitable fumigating substances are sprayed into the rear of the container 10 while the flap 36 is still fully open. When spraying is completed, the rear flap 36 is closed and secured by fasteners 40 and 42 attached to the side walls of the container 10. The animal remains in this sealed fumigated environment for a period of time. In practice, five to ten minutes have generally been found sufficient. During this period of time, the fumigating substance cannot escape the inside of the container 10. As a result, the animal experiences concentrated fumigation which effectively rids the animal of all fleas and other pests. Stricken pests fall off the animal onto the floor of the container 10. At the end of the period of time, the rear flap 36 is opened and the animal led out of the container 10 being careful to cause as little disturbance to the container as possible. With the animal removed, the rear flap 36 is once again closed and secured. This prevents the stricken pests on the floor of the container 10 from escaping and later recovering from the effects of the fumigation. The dead pests can thereafter be removed from the container 10 and disposed of in any appropriate manner.

While the invention has been described with reference to a specific embodiment, the exact nature and scope of the invention is defined in the following claims.

What is claimed is:

1. An animal fumigating apparatus comprising
a container provided with an opening sufficiently large to receive the head of an animal,
means carried by the container for providing access to the interior of the container,
a flexible member connected exteriorly to a front wall of the container and extending across said opening,
the flexible member having a portion aligned with the opening provided with intersection radial slits, said slits having sufficient length to enable said portion to flexibly receive the head of an animal projecting therethrough and to fit firmly around the animal's neck.

2. The apparatus of claim 1 wherein the intersecting slits are radially symmetrical.

3. The apparatus of claim 1 wherein the slits intersect in substantial alignment with the center of the opening.

4. The apparatus of claim 1 wherein the container is provided with walls, said menas comprising means connected to the container and one of the walls enabling selective displacement of the one wall.

5. The apparatus of claim 1 wherein the container is provided with walls, said means comprising means connected to the container and a first wall enabling selective displacement of the first wall, said opening is provided in a second wall, the first and second walls disposed in opposition.

6. The apparatus of claim 4 wherein the means connected to the container and the displaceable side wall comprise hinge means connected to the lower end of the displaceable side wall and the lower portion of the container enabling relative rotative displacement of the displaceable wall.

7. An animal fumigating apparatus comprising a container provided with a first opening sufficiently large to receive the head of an animal, a flexible member exteriorly connected to a front wall of the container and extending around and across said opening, a portion of the member aligned with the first opening provided with a second opening, means carried by the flexible member for enabling said portion to flexibly receive the head of an animal projecting therethrough and to fit firmly around the animal's neck,
the container further provided with walls, means connected to the container and a first wall enabling selective displacement of the first wall, said first opening provided in a front wall, the first and front walls disposed in opposition.

8. The apparatus of claim 7 wherein the means connected to the container and first wall comprise hinge means connected to the lower end of the displaceable wall and the lower portion of the container enabling relative rotative displacement of the first wall.

9. The apparatus of claim 1 wherein the intersecting slits are radially symmetrical and intersect in substantial alignment with the center of the opening.

10. A method of animal fumigation characterized by leading the animal into a container, projecting the head of the animal through an opening in a front wall of the container and then through a flexible member exteriorly overlying and surrounding the opening, fitting the flexible material firmly around the animal's neck, spraying a fumigating substance in the container, closing the container for a period of five to ten minutes, opening the container and leading the animal out of the container, closing the container to prevent the escape of those pests not stricken, disposing of the stricken pests in a suitable manner at a later time.

11. The method of claim 10, wherein the projecting step comprises projecting the animal's head through intersecting radial slits in the flexible material and holding the neck firmly therein.

12. The method of claim 10, wherein the opening and closing steps comprise rotating a first wall to open and closed positions.

* * * * *